No. 659,138. Patented Oct. 2, 1900.
J. DRING & T. L. MITCHELMORE.
VELOCIPEDE BRAKE.
(Application filed June 19, 1900.)
(No Model.) 3 Sheets—Sheet 3.
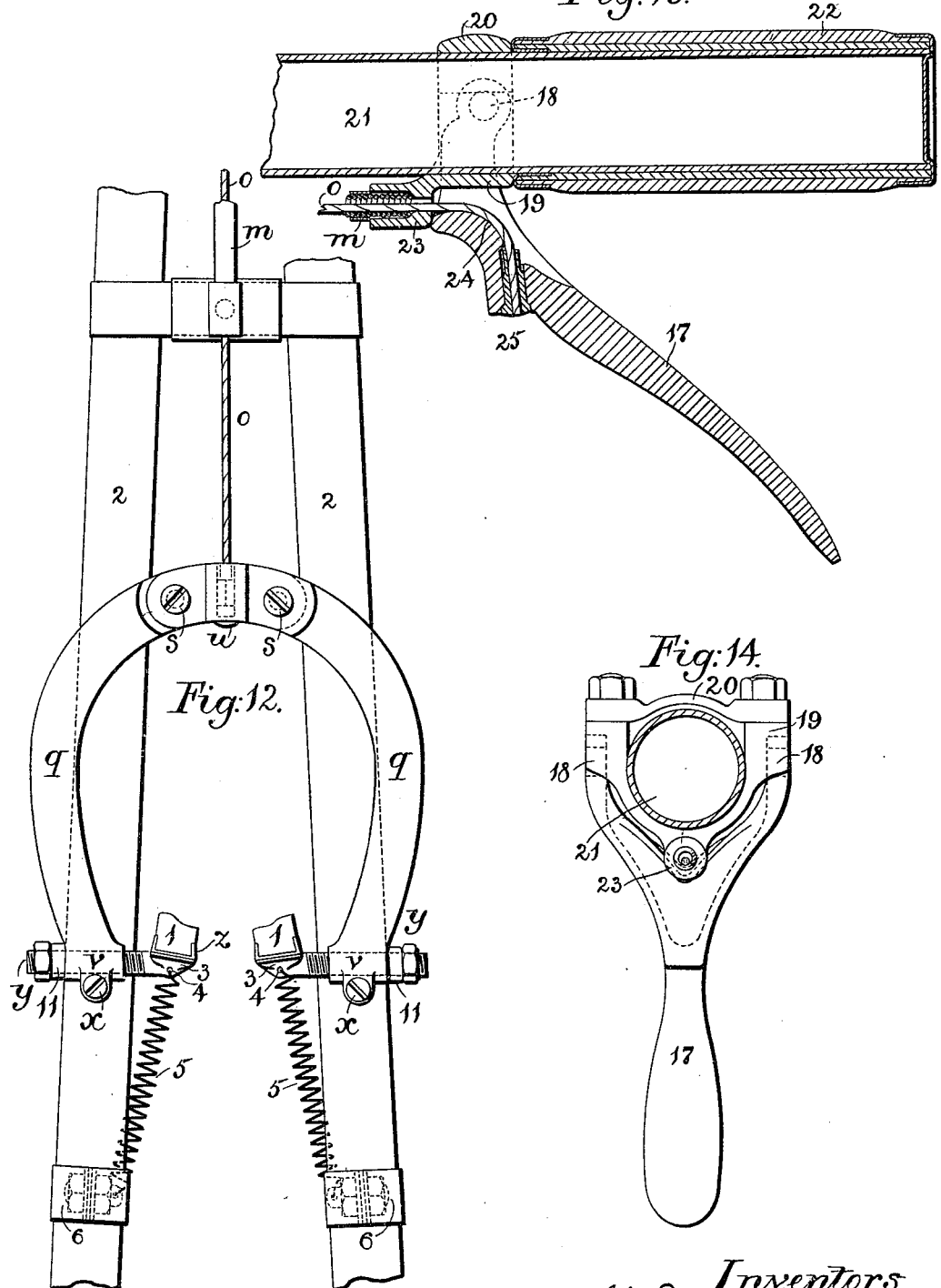

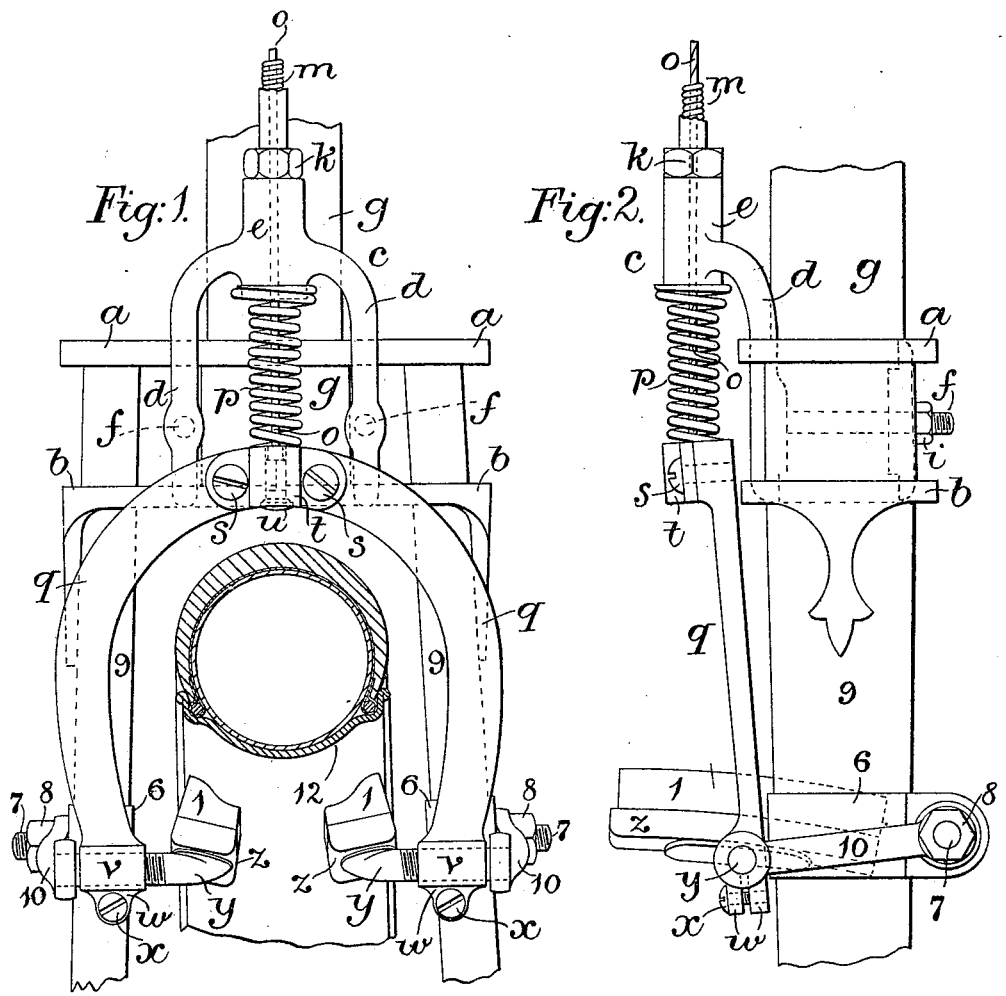

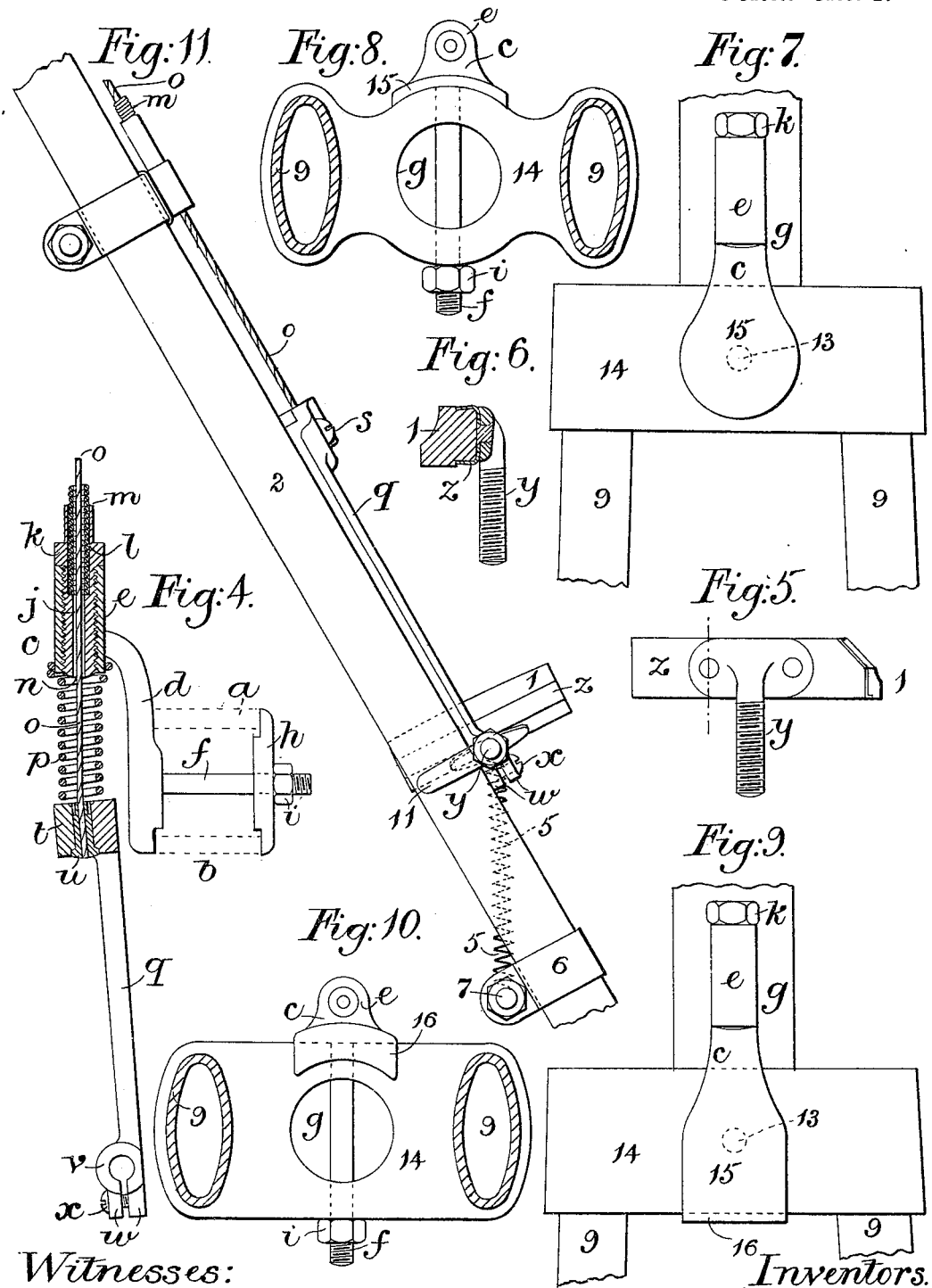

UNITED STATES PATENT OFFICE.

JOHN DRING AND THOMAS LEIGH MITCHELMORE, OF LONDON, ENGLAND.

VELOCIPEDE-BRAKE.

SPECIFICATION forming part of Letters Patent No. 659,138, dated October 2, 1900.

Application filed June 19, 1900. Serial No. 20,861. (No model.)

*To all whom it may concern:*

Be it known that we, JOHN DRING and THOMAS LEIGH MITCHELMORE, subjects of Her Majesty the Queen of Great Britain, and residents of London, in the county of Middlesex, England, have invented new and useful Improvements in and relating to Brakes for Velocipedes and other Road-Vehicles, of which the following is a specification.

Our invention relates to horseshoe-shaped rim-brakes; and it has for its objects to provide improved attachment mechanism whereby such a brake is adapted to be applied to the wheel of a velocipede or like vehicle, to modify the braking mechanism, so that adjustment of the shoes or frictional parts for wear or diversity of sizes of the parts is simplified, to provide an improved brake-operating lever, and generally to effect the improvements hereinafter indicated.

In the accompanying drawings, which are illustrative of our invention, Figure 1 is a front view, Fig. 2 is a side elevation, Fig. 3 is a partial under side view, and Fig. 4 is a detached sectional view, showing the application of the brake to the front or steering wheel of a velocipede. Figs. 5 and 6 are respectively an under side view and section of one of the friction-shoes. Figs. 7 and 8 and 9 and 10 show in front elevation and under side view, respectively, two modified forms of guide-bracket. Figs. 11 and 12 are side and face views, respectively, showing the application of the brake to the backstays of a velocipede; and Figs. 13 and 14 are respectively a sectional elevation and end view of a brake-operating lever.

According to our invention we attach to the steering-post, crown, chain-stays, or other convenient place (in the case of a double-crowned machine it may be at a point between the two crowns $a$ and $b$) a guide-bracket $c$, consisting of arms $d$, a boss $e$, and screwed stems $f$. These screwed stems $f$ pass between the crowns $a$ and $b$, one on each side of the steering-post $g$. Clamping-plates $h$ are placed over the stems $f$, and nuts $i$ serve to secure the whole bracket in position.

When brake-operating mechanism or a connecting medium such as that described in the specification of United States Letters Patent No. 609,570 is employed, the boss or socket $e$ may be screw-threaded internally to receive an adjustable bush $j$, the upper end of which is provided with a hexagon or other head $k$, and is bored, as at $l$, for a suitable distance therefrom to receive the end of the incompressible guide member $m$ of the brake-operating mechanism, while the remainder of such bush is bored, as at $n$, to a smaller diameter to allow the passage through it of the inextensible member $o$, which (in the case of Figs. 1 to 4 after passing through the spiral spring $p$) is connected with the horseshoe $q$. The incompressible guide member $m$, as shown, is constructed of a spirally-coiled wire, which may have a flexible casing, as indicated. The coils are tightly wound, and while this guide member is incompressible it is flexible and may be bent or curved in the manner indicated in Bowden's patent No. 609,570 of August 23, 1898, above referred to. The inextensible member $o$ may be in the form of a flexible rod or cable similar to that shown in Bowden's patent.

The horseshoe $q$ may be formed of two parts which overlap each other at the point of connection with the inextensible member $o$ and be there united by screws $s$ or equivalent means, as shown in Figs. 11 and 12, or the said horseshoe may be in one piece, as shown in Figs. 1 to 4, and have attached to it by the screws $s$ or otherwise a plate $t$, formed to accommodate a nipple $u$, through which the inextensible member $o$ is passed and therein soldered. Friction-shoes are carried at the extremities of the horseshoe, and it is advantageous that the said friction-shoes should be loosely jointed to the horseshoe, so that the former may readily assume and retain a true bearing on the wheel-rim. This, according to our invention, we accomplish in an improved manner and at the same time allow for the adjustment of such friction-shoes for varying sizes and shapes of wheel-rims and for adjustment for wear. For this purpose the extremities of the horseshoe are each formed with a laterally-extending internally-screw-threaded boss $v$, which may be split, as shown, and provided with lugs $w$ and a clamping-screw $x$. Into the said bosses the friction-shoes, having laterally-extending screw-threaded stems $y$, are screwed and retained in the desired position by lock-nuts, if necessary. These friction-shoes (see Figs. 5 and 6) consist of a trough-like piece of metal z, into which are inserted brake-blocks 1. The stems y are preferably riveted to the pieces z. When the horseshoe is designed to rest against the backstays 2 of a velocipede, (see Figs. 11 and 12,) the friction-shoes are each provided with an ear 3, pierced, as shown at 4, into which one end of a tension-spring 5 catches, while the opposite end of each spring is attached to a band-clamp 6, secured by a clamping-screw 7. A similar band-clamp 6, with clamping-screw 7 and nuts 8, is located on each prong 9 of the fork, (or on each of the chain-stays.) (See Figs. 1 to 4.) Pivotally connected between each clamping-screw 7 and stem y of the friction-shoe is a link 10, which while permitting the to-and-fro movement of the horseshoe as the brake is operated or released prevents the shoe from being carried around with the wheel as the velocipede travels.

In some cases when designed to rest against the backstays, Figs. 11 and 12, it is desirable to prevent the lateral movement or displacement of the horseshoe as a whole. This we accomplish by fastening onto the extremity of the stem y of each friction-shoe or onto the horseshoe itself a finger 11, which engages with the outside or inside, as may be suitable, of the stays 2 of the machine.

It will be understood that the adjustment of the bush j enables the internal shoulder to be brought close up to the end of the incompressible member m, against which it is in a position to react when the inextensible member o is put in tension by the operation of the brake-lever or other equivalent part. The rotation of the said bush j also serves to adjust the length of the inextensible member o, and consequently the position of the horseshoe. The bush j and the bush 23 of the handle, hereinafter referred to, form abutments for the incompressible member m, the former of which j is adjustable. In the brake attached to the front forks or chain-stays when the said inextensible member o is put in tension the horseshoe q is raised against the opposition of the spring p, and the horseshoe is guided by the links 10 until the blocks 1 bear upon the rim 12 of the wheel.

When the brake is designed to rest against the backstays, (see Figs. 11 and 12,) the tension-springs 5 extend from the horseshoe (or friction-shoes) to the band-clamps 6 and serve to return the brake after operation to its normal position. In the case of Figs. 1 to 4 the spring p working in compression serves the same purpose.

The guide-brackets c shown in Figs. 7 to 10 are so modified as to facilitate their application to box-crown machines and are for this purpose provided with a single screw-threaded stem f, which passes through a hole 13, bored through the box 14 and steering-post g, where it is secured by a nut i. When the box-crown is of the form shown in Figs. 7 and 8, the concavity of the plate 15 is sufficient to prevent the bracket from swinging out of the vertical position; but when the crown is of the form shown in Figs. 9 and 10 the said plate is prevented from turning by means of the flange 16, which engages the under side of the crown. As a brake-operating device we employ a bifurcated hand-lever 17, pivoted at the points 18 to a bracket 19, that is held by a clamping-plate 20 to the handle-bar 21. 22 is the handle or "grip," of felt, cork, or other usual construction. The bracket 19 is provided with a projecting lug or bush 23, bored to two different diameters, so that it forms an abutment for the end of the incompressible member m and a free way for the inextensible member o of the brake-operating mechanism or connecting medium. The hand-lever 17 is provided with a curved surface 24 and an aperture to receive a nipple 25. The curved surface 24 forms a bearing for the inextensible member o, the extremity of which member passes through and is soldered or otherwise affixed to the nipple 25.

What we claim, and desire to secure by Letters Patent, is—

1. A brake mechanism comprising in combination a horseshoe-shaped frame provided with screw-threaded bosses at its lower ends, the brake-shoes having screw-threaded stems projecting into the bosses and capable of turning therein and moving laterally to adjust the position of the shoes, and means for moving the horseshoe-shaped frame to actuate the brakes.

2. A brake mechanism comprising in combination, a guide-bracket, a boss or socket formed thereon, an adjustable bush bored to two diameters located in said boss or socket, a horseshoe-shaped frame, laterally-adjustable friction-shoes carried by said horseshoe-shaped frame, an incompressible flexible member, one end of which is seated in the larger bore of the bush, an abutment for the opposite end of the incompressible member, an inextensible member extending through the incompressible member and attached to the horseshoe-shaped frame, and an operating device attached to the opposite end of the inextensible member.

3. A brake mechanism comprising, in combination, a horseshoe, laterally-adjustable pivoted friction-shoes carried by said horseshoe, brake-operating device consisting of a bracket clamped to the handle-bar of a velocipede, a projecting lug or bush bored to two diameters carried by said bracket, a hand-lever, a curved surface on said hand-lever serving as a bearing for a connecting medium, and the connecting medium extending between said horseshoe and brake-operating device.

4. The combination with the frame of a velocipede, of a brake-carrying frame, an inextensible member connected with the brake-frame, an incompressible member surrounding the inextensible member and acting as a guide therefor, a bracket clamped to the handle-bar of a velocipede, a lug or bush on the bracket serving as an abutment for one end of the incompressible member, a hand-lever pivoted to the bracket to which one end of the inextensible member is attached and which is provided with a curved surface serving as a bearing for the inextensible member.

5. The combination with the frame of a velocipede, of a horseshoe-shaped frame, laterally-adjustable brake-shoes pivotally connected with the lower ends of the horseshoe-shaped frame, a guide-bracket attached to the frame of the velocipede, a spring interposed between the guide-bracket and the upper end of the horseshoe-shaped frame, a bush adjustable in the guide-bracket, and bored to two diameters, and a flexible connecting medium extending through the bush and attached to the brake-carrying frame, and a flexible incompressible guide-casing surrounding the inextensible member and projecting into the larger bore of the bush.

6. The combination with the frame of a velocipede, of a brake-carrying frame, an inextensible member connected at one end with the brake-carrying frame, and at its opposite end provided with an operating device, an incompressible member serving as a guide for the inextensible member, and abutments for the opposite ends of the incompressible member, one of which is adjustable in line with the axis of the incompressible member for the purpose specified.

7. A brake mechanism comprising, in combination, a horseshoe, laterally-adjustable friction-shoes carried by said horseshoe, a connecting medium consisting of an incompressible member and an inextensible member capable of relative longitudinal movement, a guide-bracket serving as an abutment for the incompressible member and a free way for the inextensible member of the connecting medium and a brake-operating device consisting of a bracket clamped to the handle-bar of a velocipede, a lug or bush serving as an abutment for the opposite end of the incompressible member and a free way for the inextensible member located on said bracket, a hand-lever and a curved surface on said hand-lever serving as a bearing for inextensible member of the connecting medium.

In testimony whereof we have hereunto subscribed our names.

JOHN DRING.
THOMAS LEIGH MITCHELMORE.

Witnesses:
J. S. WITHERS,
THOS. G. DAKIN.